(12) United States Patent
Zhang (10) Patent No.: US 9,877,280 B2
(45) Date of Patent: Jan. 23, 2018

(54) POWER SAVING METHOD AND APPARATUS FOR MULTIMODE TERMINAL

(71) Applicant: ZTE Corporation, Shenzhen (CN)

(72) Inventor: Liangqing Zhang, Shenzhen (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 89 days.

(21) Appl. No.: 15/030,986

(22) PCT Filed: Feb. 14, 2014

(86) PCT No.: PCT/CN2014/072112
§ 371 (c)(1),
(2) Date: Jul. 18, 2016

(87) PCT Pub. No.: WO2014/135001
PCT Pub. Date: Sep. 12, 2014

(65) Prior Publication Data
US 2016/0323821 A1    Nov. 3, 2016

(30) Foreign Application Priority Data
Oct. 21, 2013    (CN) .......................... 2013 1 0496018

(51) Int. Cl.
*H04W 52/02* (2009.01)
*H04W 76/04* (2009.01)
*H04W 88/06* (2009.01)

(52) U.S. Cl.
CPC ... *H04W 52/0216* (2013.01); *H04W 52/0248* (2013.01); *H04W 52/0287* (2013.01);
(Continued)

(58) Field of Classification Search
None
See application file for complete search history.

(56) References Cited

U.S. PATENT DOCUMENTS 9,020,459 B2 *  4/2015  Waters .................... G01S 19/34
                                                           375/254
9,160,395 B2 * 10/2015  Lei ......................... H01Q 1/243
(Continued)

FOREIGN PATENT DOCUMENTS

CN      102149175 A    8/2011
CN      103067907 A    4/2013
(Continued)

OTHER PUBLICATIONS

European Search Report for corresponding application EP 14 75 9489; Report dated Aug. 17, 2016.
(Continued)

*Primary Examiner* — Hong Cho
(74) *Attorney, Agent, or Firm* — Cantor Colburn LLP (57) ABSTRACT

Provided are power saving methods and devices for a multimode terminal. The method includes that: state values CLK1_EN/CLK2_EN of PWRCTRL1/PWRCTRL2 are controlled and output by using a sleep mode and a wake up mode of a Digital Baseband (DBB) of the multimode terminal; outputs CLK1_OUT/CLK2_OUT of a radio frequency transceiver (RF TRX) are controlled by using CLK1/CLK2 and the CLK1_EN/CLK2_EN; and the CLK1_OUT/CLK2_OUT are sent to a System On chip (SOC)/BUS/Peripheral and a MODEM of the DBB, wherein the CLK1_OUT/CLK2_OUT serve as a high-speed clock source of the multimode terminal in a standby state and a working state. By the solution, the multimode terminal is enabled to shorten wake up time of the MODEM subsystem and prolong sleep time within a Discontinuous Reception (DRX) period, and the effect of reducing standby power consumption is further achieved.

14 Claims, 3 Drawing Sheets

(52) U.S. Cl.
CPC .......... *H04W 76/048* (2013.01); *H04W 88/06* (2013.01); *Y02B 60/50* (2013.01)

(56) References Cited

U.S. PATENT DOCUMENTS

| | | |
|---|---|---|
| 2009/0088194 A1 | 4/2009 | Petty |
| 2009/0275355 A1 | 11/2009 | Tan |
| 2014/0308986 A1 | 10/2014 | Yang |

FOREIGN PATENT DOCUMENTS

| | | |
|---|---|---|
| CN | 202949572 U | 5/2013 |
| CN | 103260268 A | 8/2013 |

OTHER PUBLICATIONS

International Search Report for corresponding application No. PCT/CN2014/072112 filed on Feb. 14, 2014; dated Jul. 21, 2014.

\* cited by examiner

POWER SAVING METHOD AND APPARATUS FOR MULTIMODE TERMINAL

TECHNICAL FIELD

The present disclosure relates to the field of communications, and in particular to power saving methods and devices for a multimode terminal.

BACKGROUND

With the arrival of a 4th-Generation (4G) era, a Long Term Evolution (LTE) broadband high-speed (LTE category4 has a bandwidth of 20 MHz and a downlink rate of 150 Mbps/an uplink rate of 50 Mbps; and LTE category7 has a bandwidth of <20+20> MHz and a downlink rate of 300 Mbps/an uplink rate of 150 Mbps) data service has a great transmission advantage, and at the same time, a great advantage of an existing 2nd-Generation/3rd-Generation (2G/3G) (particularly 2G) voice service may also be maintained. By adopting such an advanced technology, the effects of less investment and low network operation cost can be achieved. Since a multimode dual-standby/dual-active mode can achieve such a goal, the dual-standby/dual-active mode will be an operation mode likely to be adopted by a mobile network communication operator. However, the biggest bottleneck of such an operation mode at present is the problem of standby power consumption.

For the problem of how to reduce high standby power consumption of a multimode dual-standby/dual-active terminal in a related technology, there is yet no effective solution.

SUMMARY

The embodiments of the present disclosure provide power saving methods and devices for a multimode terminal, so as to at least solve the problem.

According to one aspect of the embodiments of the present disclosure, a power saving method for a multimode terminal is provided, which may include that: state values CLK1_EN/CLK2_EN of PWRCTRL1/PWRCTRL2 are controlled and output by using a sleep mode and a wake up mode of a Digital Baseband (DBB) of the multimode terminal; outputs CLK1_OUT/CLK2_OUT of a radio frequency transceiver (RF TRX) are controlled by using CLK1/CLK2 and the CLK1_EN/CLK2_EN; and the CLK1_OUT/CLK2_OUT are sent to a System On chip (SOC)/BUS/Peripheral and a MODEM of the DBB, wherein the CLK1_OUT/CLK2_OUT serve as a high-speed clock source of the multimode terminal in a standby state and a working state.

In an example embodiment, the DBB may have a Weak Pull High Function.

In an example embodiment, before the outputs CLK1_OUT/CLK2_OUT of the RF TRX are controlled by using the CLK1/CLK2 and the CLK1_EN/CLK2_EN, the method may further include that: a Power Management Integrated Circuit (PMIC) is controlled to turn on/off output power suppliers VCLK1_EN/VCLK2_EN; and whether VCTCXO or CRYSTAL outputs a clock or not is controlled in a manner of controlling the VCLK1_EN/VCLK2_EN.

In an example embodiment, an operation mode of the multimode terminal may include one of the following combinations: 4G/3G serving as one standby/one active and 2G serving as the other standby/the other active; and 4G serving as one standby/one active and 3G/2G serving as the other standby/the other active.

According to another aspect of the embodiments of the present disclosure, a power saving device for a multimode terminal is provided, which may be located in the multimode terminal and include: a first control component, configured to control and output state values CLK1_EN/CLK2_EN of PWRCTRL1/PWRCTRL2 by using a sleep mode and a wake up mode of a DBB of the multimode terminal; a second control component, configured to control outputs CLK1_OUT/CLK2_OUT of an RF TRX by using CLK1/CLK2 and the CLK1_EN/CLK2_EN; and a sending component, configured to send the CLK1_OUT/CLK2_OUT to an SOC/BUS/Peripheral and a MODEM of the DBB, wherein the CLK1_OUT/CLK2_OUT serve as a high-speed clock source of the multimode terminal in a standby state and a working state.

In an example embodiment, the DBB may have a Weak Pull High Function.

In an example embodiment, the device may further include: a third control component, coupled to the second control component and configured to control a PMIC to turn on/off output power suppliers VCLK1_EN/VCLK2_EN; and a fourth control component, coupled to the third control component and configured to control, in a manner of controlling the VCLK1_EN/VCLK2_EN, whether VCTCXO or CRYSTAL outputs a clock or not.

In an example embodiment, an operation mode of the multimode terminal may include one of the following combinations: 4G/3G serving as one standby/one active and 2G serving as the other standby/the other active; and 4G serving as one standby/one active and 3G/2G serving as the other standby/the other active.

According to another aspect of the embodiments of the present disclosure, a power saving method for a multimode terminal is provided, which may be applied to a multimode terminal adopting a 4G/3G and 2G operation mode and include that: state values CLK1_EN/CLK2_EN of PWRCTRL1/PWRCTRL2 are controlled and output by using a sleep mode and a wake up mode of a DBB of the multimode terminal; output power suppliers V_3G/4G and V_2G of a PMIC are controlled according to the CLK1_EN/CLK2_EN; and the V_3G/4G and V_2G are provided to an RF TRX and an RF Front-End Module (FEM) of each MODEM subsystem.

According to another aspect of the embodiments of the present disclosure, a power saving device for a multimode terminal is provided, which may be located in a multimode terminal adopting a 4G/3G and 2G operation mode and include: a first control component, configured to control and output state values CLK1_EN/CLK2_EN of PWRCTRL1/PWRCTRL2 by using a sleep mode and a wake up mode of a DBB of the multimode terminal; a second control component, configured to control output power suppliers V_3G/4G and V_2G of a PMIC according to the CLK1_EN/CLK2_EN; and a provision component, configured to provide the V_3G/4G and V_2G to an RF TRX and an RF FEM of each MODEM subsystem.

According to the embodiments of the present disclosure, CLK1_OUT/CLK2_OUT controlled to be output from the RF TRX are sent to the SOC/BUS/Peripheral and the MODEM of the DBB as the high-speed clock source of the multimode terminal in the standby state and the working state; or the power suppliers V_3G/4G and V_2G controlled to be output from the PMIC are provided to the RF TRX and RF FEM of each MODEM subsystem, so that the problem of how to reduce high standby power consumption of a multimode dual-standby/dual-active terminal in the related technology is solved, the multimode terminal is enabled to shorten wake up time of the MODEM subsystem and prolong sleep time within a Discontinuous Reception (DRX) period, and the effect of reducing standby power consumption is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments. It is important to note that the embodiments in the present disclosure and characteristics in the embodiments may be combined under the condition of no conflicts.

The embodiments of the present disclosure mainly relate to the field of power consumption control of multimode (dual-standby/dual-active) mobile communication terminals (particularly LTE multimode terminals). By implementing the solutions provided in the embodiments of the present disclosure, the problem of short standby time of a dual-standby/dual-active mode terminal caused by high power consumption may be solved, and a better user experience may finally be achieved.

In order to solve the technical problem, improved solutions mainly intended to achieve a shortest working time by hardware-based automatic switching and related control between core chip sets of a terminal are provided in embodiment 1 and embodiment 2, described below, of the present disclosure.

Figure 1:
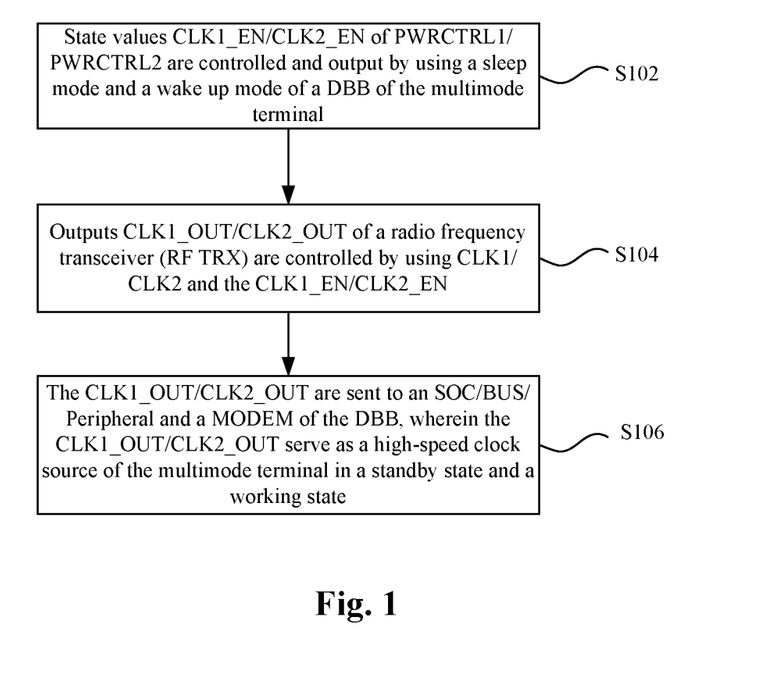
FIG. 1 is a flowchart of a power saving method for a multimode terminal according to embodiment 1 of the present disclosure.

Embodiment 1 of the present disclosure provides a power saving method for a multimode terminal. FIG. 1 is a flowchart of a power saving method for a multimode terminal according to embodiment 1 of the present disclosure. As shown in FIG. 1, the method mainly includes the following steps (Step S102-Step S106):

Step S102: state values CLK1_EN/CLK2_EN of PWRCTRL1/PWRCTRL2 are controlled and output by using a sleep mode and a wake up mode of a DBB of the multimode terminal;

Step S104: outputs CLK1_OUT/CLK2_OUT of a radio frequency transceiver (RF TRX) are controlled by using CLK1/CLK2 and the CLK1_EN/CLK2_EN; and Step S106: the CLK1_OUT/CLK2_OUT are sent to a System On chip (SOC)/BUS/Peripheral and a MODEM of the DBB, wherein the CLK1_OUT/CLK2_OUT serve as a high-speed clock source of the multimode terminal in a standby state and a working state.

In the embodiment, the DBB may have a Weak Pull High Function. In the embodiment, before Step S104 is executed, a PMIC may also be controlled to turn on/off output power suppliers VCLK1_EN/VCLK2_EN at first; and then whether VCTCXO or CRYSTAL outputs a clock or not is controlled in a manner of controlling the VCLK1_EN/VCLK2_EN.

In the embodiment, an operation mode of the multimode terminal may include one of the following combinations: 4G/3G serving as one standby/one active and 2G serving as the other standby/the other active; and 4G serving as one standby/one active and 3G/2G serving as the other standby/the other active. Of course, the operation mode is not limited to the operation mode combinations described here during a practical application.

Figure 2:
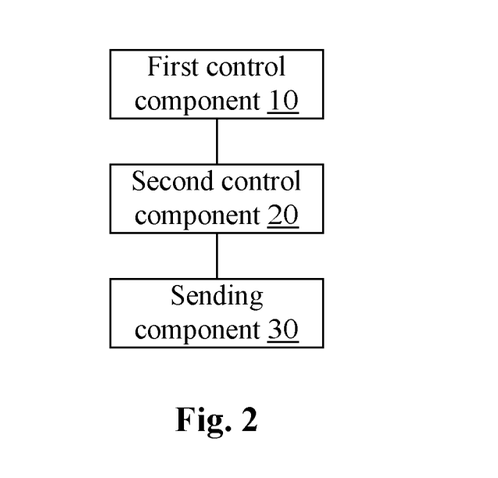
FIG. 2 is a structure block diagram of a power saving device for a multimode terminal according to embodiment 1 of the present disclosure.

Embodiment 1 of the present disclosure further provides a power saving device for a multimode terminal, which is located in the multimode terminal and configured to implement the power saving method for the multimode terminal provided by embodiment 1. FIG. 2 is a structure block diagram of a power saving device for a multimode terminal according to embodiment 1 of the present disclosure. As shown in FIG. 2, the device mainly includes: a first control component 10, a second control component 20 and a sending component 30.

The first control component 10 is configured to control and output state values CLK1_EN/CLK2_EN of PWRCTRL1/PWRCTRL2 by using a sleep mode and a wake up mode of a DBB of the multimode terminal; the second control component 20 is configured to control outputs CLK1_OUT/CLK2_OUT of a radio frequency transceiver (RF TRX) by using CLK1/CLK2 and the CLK1_EN/CLK2_EN; and the sending component 30 is configured to send the CLK1_OUT/CLK2_OUT to an SOC/BUS/Peripheral and a MODEM of the DBB, wherein the CLK1_OUT/CLK2_OUT serve as a high-speed clock source of the multimode terminal in a standby state and a working state.

Figure 3:
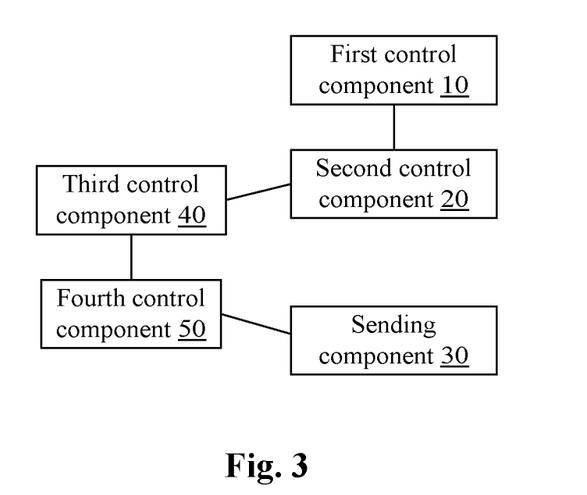
FIG. 3 is a structure block diagram of an example power saving device for a multimode terminal according to embodiment 1 of the present disclosure.

FIG. 3 is a structure block diagram of an example power saving device for a multimode terminal according to embodiment 1 of the present disclosure. As shown in FIG. 3, an example power saving device for the multimode terminal may further include: a third control component 40, coupled to the second control component 20 and configured to control a PMIC to turn on/off output power suppliers VCLK1_EN/VCLK2_EN; and a fourth control component 50, coupled to the third control component 40 and configured to control, in a manner of controlling the VCLK1_EN/VCLK2_EN, whether VCTCXO or CRYSTAL outputs a clock or not.

For the power saving device for the multimode terminal shown in FIG. 2 and the power saving device for the multimode terminal shown in FIG. 3, the DBB may have a Weak Pull High Function. During a practical application, an operation mode of the multimode terminal may include one of the following combinations: 4G/3G serving as one standby/one active and 2G serving as the other standby/the other active; and 4G serving as one standby/one active and 3G/2G serving as the other standby/the other active. Of course, the operation mode is not limited to the operation mode combinations described here and may also adopt another operation mode combination during a practical application.

Figure 4:
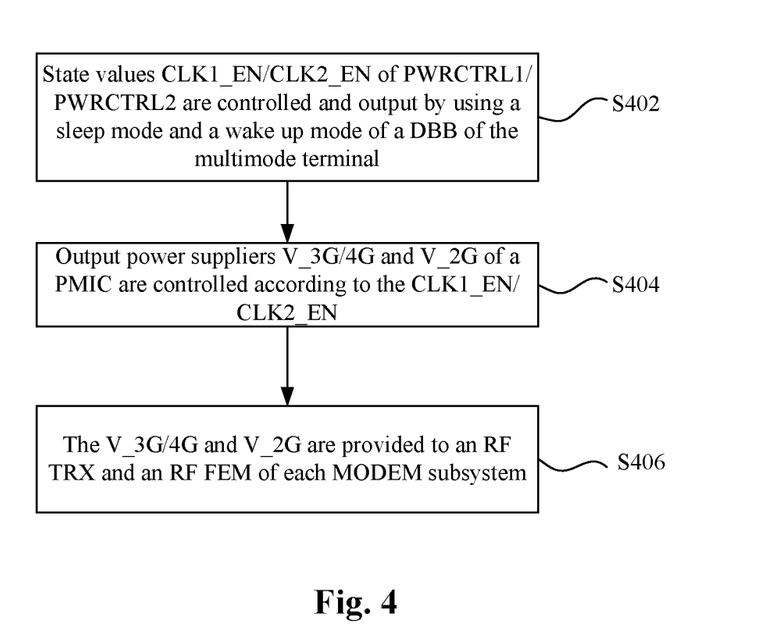
FIG. 4 is a flowchart of a power saving method for a multimode terminal according to embodiment 2 of the present disclosure.

Embodiment 2 of the present disclosure provides a power saving method for a multimode terminal, which may be applied to a multimode terminal adopting a 4G/3G and 2G operation mode. FIG. 4 is a flowchart of a power saving method for a multimode terminal according to embodiment 2 of the present disclosure. As shown in FIG. 4, the method mainly includes the following steps (Step S402-Step S406):

Step S402: state values CLK1_EN/CLK2_EN of PWRCTRL1/PWRCTRL2 are controlled and output by using a sleep mode and a wake up mode of a DBB of the multimode terminal;

Step S404: output power suppliers V_3G/4G and V_2G of a PMIC are controlled according to the CLK1_EN/CLK2_EN; and Step S406: the V_3G/4G and V_2G are provided to an RF TRX and an RF FEM of each MODEM subsystem.

Figure 5:
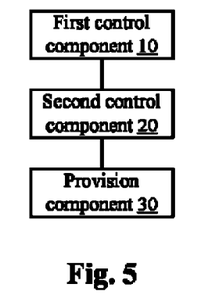
FIG. 5 is a structure block diagram of a power saving device for a multimode terminal according to embodiment 2 of the present disclosure.

Embodiment 2 of the present disclosure provides a power saving device for a multimode terminal, which is located in a multimode terminal adopting a 4G/3G and 2G operation mode and configured to implement the power saving method for the multimode terminal provided by embodiment 2. FIG. 5 is a structure block diagram of a power saving device for a multimode terminal according to embodiment 2 of the present disclosure. As shown in FIG. 5, the device mainly includes: a first control component 10, configured to control and output state values CLK1_EN/CLK2_EN of PWRCTRL1/PWRCTRL2 by using a sleep mode and a wake up mode of a DBB of the multimode terminal; a second control component 20, configured to control output power suppliers V_3G/4G and V_2G of a PMIC according to the CLK1_EN/CLK2_EN; and a provision component 30, configured to provide the V_3G/4G and V_2G to a radio frequency transceiver (RF TRX) and an RF Front-End Module (FEM) of each MODEM subsystem.

By the power saving methods and devices for the multimode terminal provided by the abovementioned embodiments, the problem of how to reduce high standby power consumption of a multimode dual-standby/dual-active terminal in the related technology is solved, the multimode terminal is enabled to shorten wake up time of the MODEM subsystem and prolong sleep time within a DRX period, and the effect of reducing standby power consumption is further achieved.

An implementation process of the power saving methods and devices for the multimode terminal provided by embodiment 1 and embodiment 2 will be described below with reference to FIG. 6 and an example embodiment in more detail.

First of all, a concept of solving the technical problem in the example embodiments is briefly introduced: (1) a clock source is automatically turned on/off through hardware to shorten a switching time between sleep and wake up; and (2) a public module in a DBB chip shares the same clock source with one fixed MODEM subsystem; or a public module in a DBB chip shares the same clock source with one flexibly configured MODEM subsystem selected by hardware (i.e., two different manners), so that wake up time of the MODEM subsystem is shortened and sleep time is prolonged to fulfill the aim of reducing power consumption within one DRX period.

In the example embodiment, description will be made with an operation mode combination of 4G/3G serving as one standby/one active and 2G serving as the other standby/the other active as an example. Of course, the example embodiment is also applicable to an operation mode combination of 4G serving as one standby/one active and 3G/2G serving as the other standby/the other active, or other dual-standby/dual-active adopting different operation modes or the same operation modes.

Figure 6:
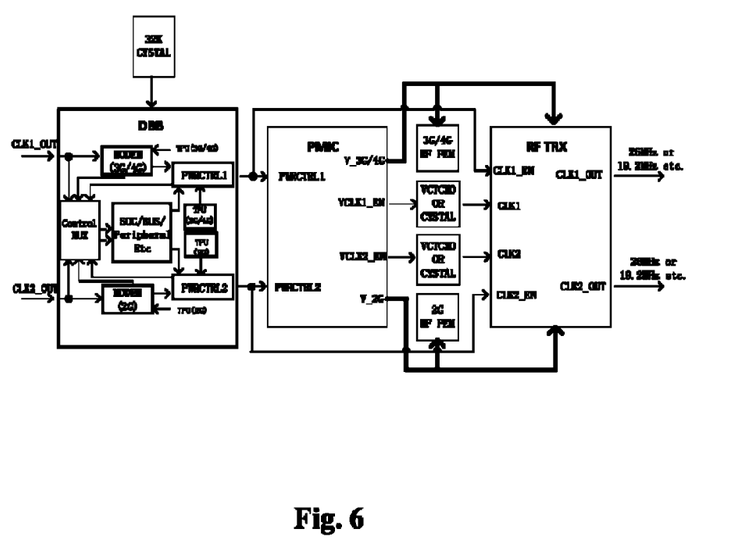
FIG. 6 is a flowchart of a multimode (dual-standby/dual-active) for a handheld terminal according to an example embodiment of the present disclosure.

Before detailed description about the example embodiment with reference to FIG. 6, an implementation process of the example embodiment will be briefly introduced at first. For the clock source of the public module in the DBB chip, the example embodiment provides two solutions: A, a hardware-based flexible configuration manner is adopted, and the clock source is shared with one selected MODEM subsystem; and B, the clock source is shared with one fixed MODEM subsystem. Compared with solution B, solution A is lower in standby power consumption, namely more power-saving.

FIG. 6 is a flowchart of a multimode (dual-standby/dual-active) power saving method for a handheld terminal according to an example embodiment of the present disclosure. The solution A and solution B will be further described below with reference to FIG. 6.

Solution A (clock source power supply solution) is implemented by the following steps.

(1) PWRCTRL1/PWRCTRL2 of a DBB has a Weak Pull High Function so as to ensure that the entire terminal has an available system clock as a default.

(2) Different state values of PWRCTRL1/PWRCTRL2 are controlled and output by using sleep and wake up modes of the DBB.

(3) A PMIC is controlled to turn on/off its output power suppliers VCLK1_EN/VCLK2_EN.

(4) Whether VCTCXO or CRYSTAL has clock output or not is controlled by controlling the power VCLK1_EN/VCLK2_EN.

(5) an RF TRX is made, by the combination of CLK1/CLK2 and CLK1_EN/CLK2_EN (PWRCTRL1/PWRCTRL2 output by the DBB), to output proper CLK1_OUT/CLK2_OUT.

(6) CLK1_OUT/CLK2_OUT are provided to an SOC/BUS/Peripheral and a MODEM of the DBB as a high-speed clock source in a standby (wake up) state and a working state.

Solution B (4G/3G, 2G MODEM subsystem RF TRX and RF FEM power supply solution) is implemented mainly by the following steps.

(1) Different state values of PWRCTRL1/PWRCTRL2 are controlled and output by using sleep and wake up modes of a DBB.

(2) A PMIC is controlled to output proper power V_3G/4/V_2G and the V_3G/4G/V_2G are provided to an RF TRX and an RF FEM of each MODEM subsystem, thereby shortening the time of power supply to 4G/3G, 2G RF TRX and RF FEM (see the blackened connecting line part in FIG. 6).

By the two implementation solutions, control between chips and between modules in the chips is directly implemented through hardware, and such a control manner may be written into a constant power supplied area (i.e. an area where power is supplied all the time in a startup state) of the DBB during software initialization. (1) on the aspect of clock software/hardware control: the hardware control manner reduces time required by software configuration and execution of sleep and wake up switching under, e.g., a 32K slow clock, thereby reducing power consumption; and (2) on the aspect of clock source selection: a requirement of a clock source of the SOC/BUS/Peripheral of the DBB on both CLK1_OUT and CLK2_OUT is optimized into a requirement on only one CLK* under the condition that one MODEM is in the wake up mode and the other MODEM is in the sleep mode, so that power consumption can be reduced.

The example embodiment will be further described below in detail, and is implemented by the following steps.

Step 1: A Time Processing Unit (TPU) (3G/4G) and a TPU (2G) realize an automatic hardware timing function and an equivalent time fitting function for the timing performed based on clock sources of different frequencies, wherein the clock source may adopt low-speed, e.g., 32K crystal or high-speed, e.g., 26 MHz or 19.2 MHz or other frequency.

Step 2: A clock source of one MODEM subsystem is flexibly configured and selected by hardware for sharing.

Specifically, a control Multiplexer (MUX) may implement selection of the input high-speed clocks CLK1_OUT and CLK2_OUT, hardware-based automatic switching may be performed by configuration of the MODEMs (4G/3G 2G), PWRCTRL1 and PWRCTRL2, and the selected clock is output to the SOC/BUS/Peripheral etc. The input clocks in different scenarios are selected as follows:

CLK1_OUT is selected under the condition that 4G/3G is performing a data/voice service and 2G is in a standby wake up/sleep state;

CLK1_OUT is selected under the condition that 4G/3G is performing a data/voice service and 2G is performing a voice/data service;

CLK2_OUT is selected under the condition that 4G/3G is in a standby wake up/sleep state and 2G is performing a voice/data service;

CLK1_OUT is selected under the condition that 4G/3G is in a standby wake up/sleep state and 2G is in a standby wake up state;

CLK1_OUT is selected under the condition that 4G/3G is in a standby wake up state and 2G is in a standby sleep state; and CLK2_OUT is selected under the condition that 4G/3G is in a standby sleep state and 2G is in a wake up state.

In case that a clock source is shared with one fixed MODEM subsystem, except the logic MUX module in FIG. 6, the input clocks in different scenarios may be selected to be shared with a clock source of a 3G/4G subsystem.

Step 3: a MODEM (3G/4G) and a MODEM (2G) respectively implement MODEM mode setting and control, e.g., control over each state (TX/RX/idle/clock/sleep), working service mode and standby mode (wake up/sleep) of the MODEMs and control over a related condition for output of PWRCTRL1, PWRCTRL2 and the control MUX.

Step 4: the SOC/BUS/peripheral outputs the working and standby sleep state of the module to PWRCTRL2 and PWRCTRL1 for related power saving control.

Step 5: PWRCTRL2 and PWRCTRL1 implement output of the working and standby sleep states of the entire machine and control over various kinds of power suppliers of the PMIC. In order to facilitate understanding, two examples are listed for description.

Example 1: a clock source of one MODEM subsystem is flexibly configured and selected for sharing by hardware. For example, for PWRCTRL1: when the MODEM (3G/4G) and the SOC/BUS/Peripheral enter the standby sleep state from the working state, PWRCTRL1 is made, by hardware switching (configured and stored in the constant power supplied area of the DBB during software initialization), to automatically output the "0" sleep state to the PMIC; when the MODEM (3G/4G) reaches a wake up moment set at a sleep entry time point, a hardware wake up interrupt is output to PWRCTRL1 through a TPU module, so that PWRCTRL1 automatically outputs the "1" wake up state to the PMIC through the hardware. The same control procedure is applied also to PWRCTRL2, and will not be repeated here.

Example 2: the clock source is shared with a clock source of one fixed MODEM subsystem. For example, for PWRCTRL1: when the MODEM (3G/4G), the SOC/BUS/Peripheral and the MODEM (2G) enter the standby sleep state from the working state, PWRCTRL1 is made, by hardware switching (configured and stored in the constant power supplied area of the DBB during software initialization), to automatically output the "0" sleep state to the PMIC; when the MODEM (3G/4G) or the MODEM (2G) reaches the wake up moment set at the sleep entry point time, a hardware wake up interrupt is output to PWRCTRL1 through the TPU module, so that PWRCTRL1 automatically outputs the "1" wake up state to the PMIC through the hardware. The same control procedure as described in the Example 1 is applied also to PWRCTRL2, and will not be repeated here.

Step 6: the PMIC implements different power configuration output according to different input states of PWRCTRL1 and PWRCTRL2. For example: when PWRCTRL1 is "0", the PMIC turns off the related power supplier provided for 3G/4G; and when PWRCTRL1 is "1", the PMIC turns on the related power supplier provided for 3G/4G.

Step 7: the RF TRX implements output of a 26 MHz or 19.2 MHz clock of the transceiver or other clock required by the DBB, wherein the enabling control of a clock output circuit is PWRCTRL1 and PWRCTRL2 output by the DBB.

During a practical application, standby power consumption of the handheld terminal determines its commercialization degree to a certain extent. The example embodiment is favorable for further reducing the standby power consumption, thereby enabling a user to experience a high-speed data service and enjoy a high-quality voice service.

It is important to note that each of the abovementioned components may be implemented by hardware. For example: a processor includes each of the abovementioned components, or, each of the abovementioned components is located in a processor.

In another embodiment, software is further provided, which is configured to execute the technical solutions described in the abovementioned embodiments and example implementation mode.

In another embodiment, a storage medium is further provided, in which the abovementioned software is stored, the storage medium including, but not limited to: a compact disc, a floppy disk, a hard disk, an erasable memory and the like.

From the above, it can be seen that the embodiments of the present disclosure achieve the following technical effects: CLK1_OUT/CLK2_OUT output by the RF TRX are sent to the SOC/BUS/Peripheral and the MODEM of the DBB as the high-speed clock source of the multimode terminal in the standby state and the working state; or the power suppliers V_3G/4G and V_2G controlled to be output from the PMIC are provided to the RF TRX and RF FEM of each MODEM subsystem, so that the problem of how to reduce high standby power consumption of a multimode dual-standby/dual-active terminal in the related technology is solved, the multimode terminal is enabled to shorten wake up time of the MODEM subsystem and prolong sleep time within a DRX period, and the effect of reducing standby power consumption is further achieved.

Obviously, those skilled in the related field should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from the sequences here under some circumstances, or the components or steps may form each integrated circuit component respectively, or multiple components or steps therein can form a single integrated circuit component for implementation. As a consequence, the present disclosure is not limited to any specific hardware and software combination.

INDUSTRIAL APPLICABILITY

By the technical solutions of the embodiments of the present disclosure, the multimode terminal is enabled to shorten wake up time of the MODEM subsystem and prolong sleep time within a DRX period, and the effect of reducing standby power consumption is further achieved.

The above is only the example embodiments of the present disclosure and not intended to limit the present disclosure. For those skilled in the relative field, the prevent disclosure may have various modifications and variations. Any modification, equivalent replacement, improvement and the like made within the principle of the present disclosure shall fall within the scope of protection defined by the claims of the present disclosure.

What is claimed is:

1. A power saving method for a multimode terminal, the method comprising:
controlling and outputting state values CLK1_EN/CLK2_EN of PWRCTRL1/PWRCTRL2 by using a sleep mode and a wake up mode of a Digital Baseband (DBB) of the multimode terminal;
controlling outputs CLK1_OUT/CLK2_OUT of a radio frequency transceiver (RF TRX) by using CLK1/CLK2 and the CLK1_EN/CLK2_EN; and
sending the CLK1_OUT/CLK2_OUT to a System On chip (SOC)/BUS/Peripheral and a MODEM of the DBB, wherein the CLK1_OUT/CLK2_OUT serve as a high-speed clock source of the multimode terminal in a standby state and a working state.

2. The method as claimed in claim 1, wherein the DBB has a Weak Pull High Function.

3. The method as claimed in claim 2, before controlling the output CLK1_OUT/CLK2_OUT of the RF TRX by using the CLK1/CLK2 and the CLK1_EN/CLK2_EN, further comprising:
controlling a Power Management Integrated Circuit (PMIC) to turn on/off output power suppliers VCLK1_EN/VCLK2_EN; and
controlling, in a manner of controlling the VCLK1_EN/VCLK2_EN, whether VCTCXO or CRYSTAL outputs a clock or not.

4. The method as claimed in claim 3, wherein an operation mode of the multimode terminal comprises one of the following combinations:
4th-Generation/3rd-Generation (4G/3G) serving as one standby/one active and 2nd-Generation (2G) serving as the other standby/the other active; and
4G serving as one standby/one active and 3G/2G serving as the other standby/the other active.

5. The method as claimed in claim 2, wherein an operation mode of the multimode terminal comprises one of the following combinations:
4th-Generation/3rd-Generation (4G/3G) serving as one standby/one active and 2nd-Generation (2G) serving as the other standby/the other active; and
4G serving as one standby/one active and 3G/2G serving as the other standby/the other active.

6. The method as claimed in claim 1, wherein an operation mode of the multimode terminal comprises one of the following combinations:
4th-Generation/3rd-Generation (4G/3G) serving as one standby/one active and 2nd-Generation (2G) serving as the other standby/the other active; and
4G serving as one standby/one active and 3G/2G serving as the other standby/the other active.

7. A power saving device for a multimode terminal, wherein the power saving device is located in the multimode terminal and comprises:
a first control component, configured to control and output state values CLK1_EN/CLK2_EN of PWRCTRL1/PWRCTRL2 by using a sleep mode and a wake up mode of a Digital Baseband (DBB) of the multimode terminal;
a second control component, configured to control outputs CLK1_OUT/CLK2_OUT of a radio frequency transceiver (RF TRX) by using CLK1/CLK2 and the CLK1_EN/CLK2_EN; and
a sending component, configured to send the CLK1_OUT/CLK2_OUT to a System On chip (SOC)/BUS/Peripheral and a MODEM of the DBB, wherein the CLK1_OUT/CLK2_OUT serve as a high-speed clock source of the multimode terminal in a standby state and a working state.

8. The device as claimed in claim 7, wherein the DBB has a Weak Pull High Function.

9. The device as claimed in claim 8, further comprising:
a third control component, coupled to the second control component and configured to control a Power Management Integrated Circuit (PMIC) to turn on/off output power suppliers VCLK1_EN/VCLK2_EN; and
a fourth control component, coupled to the third control component and configured to control, in a manner of controlling the VCLK1_EN/VCLK2_EN, whether VCTCXO or CRYSTAL outputs a clock or not.

10. The device as claimed in claim 9, wherein an operation mode of the multimode terminal comprises one of the following combinations:
4th-Generation/3rd-Generation (4G/3G) serving as one standby/one active and 2nd-Generation (2G) serving as the other standby/the other active; and
4G serving as one standby/one active and 3G/2G serving as the other standby/the other active.

11. The device as claimed in claim 8, wherein an operation mode of the multimode terminal comprises one of the following combinations:
4th-Generation/3rd-Generation (4G/3G) serving as one standby/one active and 2nd-Generation (2G) serving as the other standby/the other active; and
4G serving as one standby/one active and 3G/2G serving as the other standby/the other active.

12. The device as claimed in claim 7, wherein an operation mode of the multimode terminal comprises one of the following combinations:
4th-Generation/3rd-Generation (4G/3G) serving as one standby/one active and 2nd-Generation (2G) serving as the other standby/the other active; and 4G serving as one standby/one active and 3G/2G serving as the other standby/the other active.

13. A power saving method for a multimode terminal, wherein the method is applied to a multimode terminal adopting a 4th-Generation/3rd-Generation (4G/3G) and 2nd-Generation (2G) operation mode and comprises:
- controlling and outputting state values CLK1_EN/CLK2_EN of PWRCTRL1/PWRCTRL2 by using a sleep mode and a wake up mode of a Digital Baseband (DBB) of the multimode terminal;
- controlling output power suppliers V_3G/4G and V_2G of a Power Management Integrated Circuit (PMIC) according to the CLK1_EN/CLK2_EN; and
- providing the V_3G/4G and V_2G to a radio frequency transceiver (RF TRX) and an RF Front-End Module (FEM) of each MODEM subsystem.

14. A power saving device for a multimode terminal, wherein the device is located in a multimode terminal adopting a 4th-Generation/3rd-Generation (4G/3G) and 2nd-Generation (2G) operation mode and comprises:
- a first control component, configured to control and output state values CLK1_EN/CLK2_EN of PWRCTRL1/PWRCTRL2 by using a sleep mode and a wake up mode of a Digital Baseband (DBB) of the multimode terminal;
- a second control component, configured to control output power suppliers V_3G/4G and V_2G of a Power Management Integrated Circuit (PMIC) according to the CLK1_EN/CLK2_EN; and
- a provision component, configured to provide the V_3G/4G and V_2G to a radio frequency transceiver (RF TRX) and an RF Front-End Module (FEM) of each MODEM subsystem.

* * * * *